United States Patent [19]

Nakagawa

[11] 4,315,636
[45] Feb. 16, 1982

[54] WORKING VEHICLE

[75] Inventor: Masao Nakagawa, Sakai, Japan

[73] Assignee: Kubota, Ltd., Japan

[21] Appl. No.: 83,633

[22] Filed: Oct. 11, 1979

[30] Foreign Application Priority Data

Feb. 21, 1979 [JP] Japan .................................. 54-19510

[51] Int. Cl.³ .............................................. B60G 17/04
[52] U.S. Cl. ...................................... 280/703; 188/299
[58] Field of Search ................. 280/703, 702; 180/271; 188/299

[56] References Cited

U.S. PATENT DOCUMENTS 2,574,280 11/1951 Obert .................................... 280/703
2,954,237 9/1960 Sampietro .......................... 280/703
3,945,664 3/1976 Hiruma ................................ 280/703

Primary Examiner—Richard A. Bertsch
Assistant Examiner—Michael Mar
Attorney, Agent, or Firm—Kane, Dalsimer, Kane, Sullivan and Kurucz

[57] ABSTRACT

A working vehicle having a pair of opposite wheels movable up and down with each other in opposed relation under hydraulic pressure, and brakes for braking the vehicle during running and also for parking the vehicle. The circuit for the hydraulic pressure is provided with a stop valve which is coupled to the system for operating the brakes by a mechanism for holding the stop valve opened while the vehicle is not braked and also when the vehicle is braked for a speed reduction during running and for holding the stop valve closed while the vehicle is braked for parking.

1 Claim, 4 Drawing Figures

WORKING VEHICLE

BACKGROUND OF THE INVENTION

The present invention relates to a working vehicle having a pair of opposite wheels movable up and down with each other in opposed relation, a pair of hydraulic cylinders extensible or contractable in opposed relation to each other by the up-and-down movement of the wheels and interconnected by a closed piping channel, a stop valve mounted on the closed piping channel and brakes for braking the vehicle during running and also for parking the vehicle, the vehicle thus being adapted to travel on a rough ground with stability by absorbing the jerky movement of the vehicle body due to the irregularities on the ground surface.

While vehicles of this type are stopped and operated for working in a fixed position, the vehicle body is liable to jolt when subjected to the working reaction of the working implement and therefore fails to ensure a smooth operation with stability. Accordingly it is necessary to restrain the wheels against an up-and-down jerky movement. To assure this effectively, the wheels are usually adapted to be so restrained by a brake actuating procedure. Such an operatively associated arrangement nevertheless involves the problem that when the brake is operated for a speed reduction during running as well as for stopping or parking, the wheels are restrained from moving up and down, consequently reducing the stability of the vehicle during travel.

SUMMARY OF THE INVENTION

In view of the above problem, the main object of this invention is to provide a working vehicle in which a pair of wheels are prevented from moving up and down only when the brake is operated to stop the vehicle for working and which is adapted to run with stability even when the brake is operated for a speed reduction, the vehicle being operable with its body stabilized during working to assure safety.

The present invention provides a working implement of the type described above which is characterized in that a system for operating the brakes is coupled to the stop valve by means for holding the stop valve opened while the vehicle is not braked and when the vehicle is braked for a speed reduction during running and for holding the stop valve closed while the vehicle is braked for parking.

Thus the coupling means assures that while the brakes are out of operation and when the brakes are actuated for a speed reduction during running, the pair of wheels are allowed to move up and down, with the result that during running in the usual manner or even when the brakes are operated for a speed reduction, the wheels remain free of any restraint and permit the vehicle to travel with stability on a rough ground. When the vehicle is braked for parking to work in a fixed position, the wheels are prevented from moving up and down and thereby fixed to the vehicle body which is equipped with a working implement, thus preventing the vehicle body from jolting or jerking against the working reaction and holding the body in a stabilized position for working. In this way, the vehicle is operable smoothly for running as well as for working in a fixed position.

Other objects and advantages of the invention will become apparent from the following description.

DESCRIPTION OF THE PREFERRED EMBODIMENT

Figure 1:
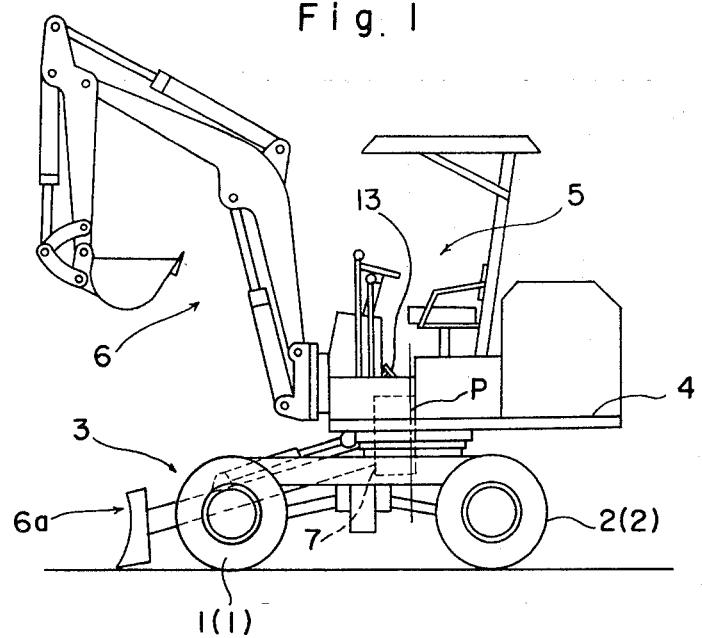
FIG. 1 is an overall side elevation showing a working vehicle embodying the invention.
Figure 2:
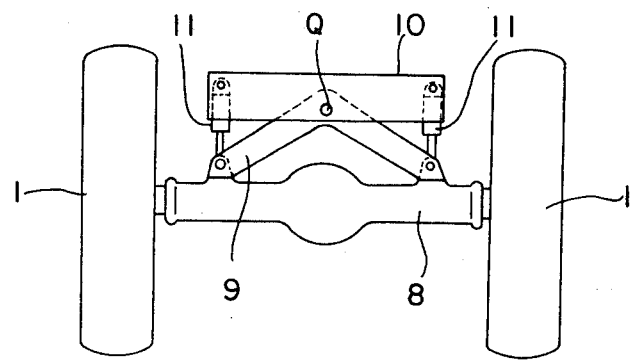
FIG. 2 is a fragmentary front view showing the vehicle.

With reference to FIGS. 1 and 2, a vehicle body has running means 3 comprising front and rear wheels 1 and 2. A swivel base 4 mounted on the vehicle body and turnable about a vertical axis P is provided with a steering assembly 5. An excavating device 6 is laterally shiftably attached to a front portion of the swivel base 4. Pressure oil serving as a fluid for a hydraulic drive is fed to the running means 3 through a rotary joint 7 and also to the swivel base 4, the excavating device 6 and an earth removing device 6a attached to the vehicle body. Thus the working vehicle is adapted to remove earth and also to excavate earth.

An axle case 8 supporting the pair of opposite front wheels 1, 1 is provided with a frame 9, which is connected to the frame 10 of the vehicle body pivotally movably about an axis Q extending longitudinally of the vehicle body as seen in FIG. 2. Provided between the frame 9 and the vehicle body frame 10 are a pair of hydraulic cylinders 11, 11 which are extensible or contractable in opposed relation to each other by the up-and-down movement of the wheels 1, 1 relative to the vehicle body frame 10. The cylinders 11, 11 are interconnected by a closed piping channel 12 in communication with each other to absorb and reduce the shake of the vehicle body to be caused by the irregularities on the ground surface during running, by the opposed movement of the wheels 1, 1.

The closed piping channel 12 is provided at an intermediate portion thereof with a stop valve V, which is coupled to a pedal 13 serving as a component of a system for operating front and rear pairs of opposite brakes for braking the vehicle during running and also for parking, as will be described below.

Figure 3:
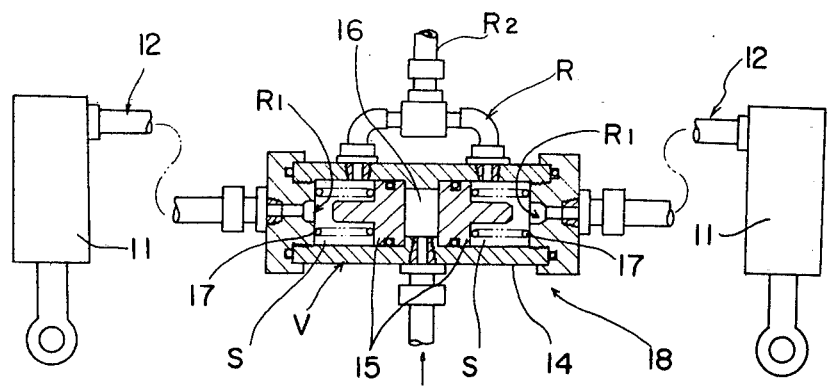
FIG. 3 is a view in vertical section showing a stop valve and coupling means.
Figure 4:
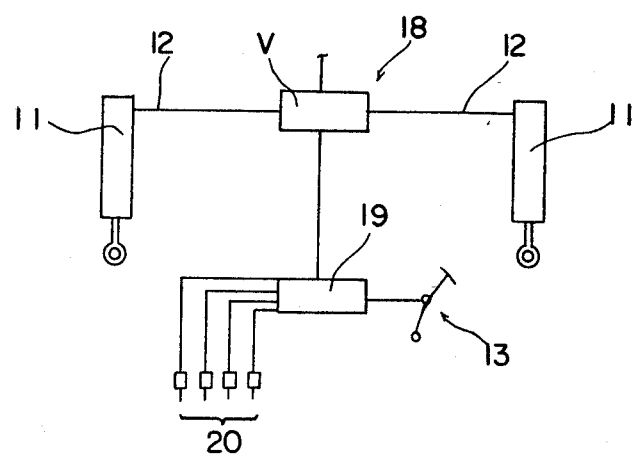
FIG. 4 is a diagram showing an operating system.

With reference to FIG. 3, the stop valve V comprises a valve case 14 having at its opposite sides oil spaces S, S held in communication with each other by a connecting channel R. The oil spaces S, S are in communication with passages $R_1$, $R_1$ formed in the valve case 14 and communicating with the closed piping channel 12. The valve case 14 houses valve elements 15, 15 for opening or closing the communicating passages $R_1$, $R_1$ respectively. Formed between the valve elements 15, 15 is a cylinder chamber 16 for receiving pressure oil from the master cylinder 19, shown in FIG. 4, to be operated by the pedal 13.

The valve elements 15, 15 are biased by springs 17, 17 at all times in a direction to open the passages $R_1$, $R_1$. When the master cylinder 19 is operated to actuate the brakes 20 for parking the vehicle, the valve elements 15, 15 are shifted against the action of the springs 17, 17 to close the passages $R_1$, $R_1$. The coupling means 18 thus provided holds the stop valve V opened while the vehicle is not braked and when the vehicle is braked for a speed reduction during running, and holds the stop valve V closed while the vehicle is braked for parking.

Each of the springs 17, 17 remains in position against compression if subjected to the output pressure of the master cylinder 19 when the pedal 13 is acted on by a braking force for reducing the speed of the vehicle, whereas the spring 17 is compressible only when the brakes 20 are operated with a great force to park the vehicle.

A drain channel $R_2$ extending from a running hydraulic motor (not shown) is connected via a one-way valve to the connecting channel R to replenish the valve V with oil.

The coupling means 18 can be modified variously. For example, the stop valve V may be of the electromagnetic type, in combination with a limit switch which is provided beside the brake operating pedal 13 and which is adapted to function when the pedal 13 is depressed to the greatest extent, namely when the vehicle is braked for parking, so that the stop valve V is closable only when the brakes are operated for parking.

I claim:

1. A working vehicle comprising:

a vehicle body frame;

a pair of left and right wheels oscillatable up and down in opposed relation to each other;

a pair of left and right oil cylinders mounted with respect to said body frame and said wheels to be extensible or contractable in opposed relation to each other with the up and down oscillation of said wheels relative to said body frame;

a master oil cylinder;

wheel brakes actuable by oil pressure for reducing speed of the vehicle during running and also for maintaining a parking condition of the vehicle, said wheel braked being connected to said master cylinder;

means for actuating said master cylinder;

a piping channel interconnecting said pair of oil cylinders, said piping channel including a valve means connected with said master oil cylinder, said valve means including: (a) a valve case; (b) a pair of oil spaces defined by said valve case on opposite sides thereof, a connecting channel establishing fluid communication between said oil spaces, an oil supply channel connected to said connecting channel for replenishing said pipe channel with oil; (c) a pair of oil passages formed in said valve case for communicating said oil spaces, respectively, with said piping channel; (d) a pair of valve elements disposed within said valve case and shiftable between positions to open and to close said oil passages, respectively; (e) a pair of springs constantly urging said valve elements toward the positions to open said oil passages, respectively; and (f) a further oil space defined by said valve case and said pair of valve elements and communicating with said master oil cylinder to urge said valve elements towards the positions to close said oil passages by oil pressure therein transmitted from said master oil cylinder;

said pair of springs having such resiliency so as to permit said pair of valve elements to close said pair of oil passages only when the oil pressure from said master cylinder exceeds a first level corresponding to maintaining the parking condition of the vehicle, but allowing said valve element to assume a position wherein said oil passages are open while the oil pressure from said motor cylinder is at a second level lower than said first level, said second level corresponding to oil pressure associated with speed reduction or nonactuation of said master cylinder, whereby said wheels are locked against oscillation only while the vehicle is in the parking condition.

* * * * *